US007778718B2

(12) United States Patent
Janke et al.

(10) Patent No.: US 7,778,718 B2
(45) Date of Patent: Aug. 17, 2010

(54) FREQUENCY NORMALIZATION OF AUDIO SIGNALS

(75) Inventors: Anthony D. Janke, Chandler, AZ (US); Ryan J. Perkofski, Phoenix, AZ (US)

(73) Assignee: Rockford Corporation, Tempe, AZ (US)

( * ) Notice: Subject to any disclaimer, the term of this patent is extended or adjusted under 35 U.S.C. 154(b) by 785 days.

(21) Appl. No.: 11/136,274

(22) Filed: May 24, 2005

(65) Prior Publication Data

US 2006/0271215 A1 Nov. 30, 2006

(51) Int. Cl.
*G06F 17/00* (2006.01)

(52) U.S. Cl. .......................... 700/94; 381/103; 375/229

(58) Field of Classification Search .................... 700/94
See application file for complete search history.

(56) References Cited

U.S. PATENT DOCUMENTS 4,038,496 A * 7/1977 Feezor ........................ 73/585
4,182,930 A * 1/1980 Blackmer .................... 381/28
4,698,842 A * 10/1987 Mackie et al. ................. 381/1
4,739,514 A 4/1988 Short et al.
4,748,669 A * 5/1988 Klayman ....................... 381/1
5,027,403 A * 6/1991 Short et al. ................. 381/306
5,208,866 A * 5/1993 Kato et al. .................. 381/107
5,319,713 A * 6/1994 Waller et al. .................. 381/22
5,339,362 A 8/1994 Harris
5,363,057 A * 11/1994 Furuno ....................... 330/129
5,515,446 A * 5/1996 Velmer ........................ 381/98
5,557,680 A * 9/1996 Janes .......................... 381/27
5,581,621 A 12/1996 Koyama et al.
5,610,986 A * 3/1997 Miles .......................... 381/27
5,617,478 A * 4/1997 Tagami et al. ................. 381/56
5,617,480 A 4/1997 Ballard et al.
5,636,244 A 6/1997 Goodson et al.
5,790,481 A 8/1998 Meitner
6,104,750 A 8/2000 Yiu
6,115,476 A * 9/2000 O'Conner et al. ........... 381/103
6,252,968 B1 6/2001 Narasimhan et al.
6,341,166 B1 * 1/2002 Basel ......................... 381/103
6,470,087 B1 * 10/2002 Heo et al. ..................... 381/17
6,584,204 B1 6/2003 Al-Ali et al.
6,662,018 B1 * 12/2003 Kintis et al. ................ 455/522
6,718,039 B1 4/2004 Klayman et al.

(Continued)

OTHER PUBLICATIONS

Analog and Digital Systems, Inc., Mobile Electronics Products Jan. 1, 1999 Price List.

(Continued)

*Primary Examiner*—Curtis Kuntz
*Assistant Examiner*—Paul McCord
(74) *Attorney, Agent, or Firm*—Steptoe & Johnson LLP

(57) ABSTRACT

A system and method is provided to produce a flatter frequency response from an audio source that has a non-flat frequency response and, as such, has missing spectral content. The system and method achieves a flatter frequency response by characterizing the frequency response of the audio source based upon a reference input signal. This reference input signal is used to establish a reference frequency response, which is stored in a memory and used to select equalizer settings. The system restores missing spectral content by way of summing multiple input signals from the audio source. The system then normalizes the frequency response based on characterizations of the signal by utilizing equalizer settings from memory.

20 Claims, 6 Drawing Sheets

U.S. PATENT DOCUMENTS

| | | | | |
|---|---|---|---|---|
| 6,760,451 | B1 * | 7/2004 | Craven et al. | 381/98 |
| 6,898,470 | B1 * | 5/2005 | Rao et al. | 700/94 |
| 7,027,497 | B2 * | 4/2006 | Ohmori et al. | 375/229 |
| 7,031,474 | B1 * | 4/2006 | Yuen et al. | 381/1 |
| 7,058,144 | B2 * | 6/2006 | Baldwin | 375/346 |
| 7,167,515 | B2 * | 1/2007 | Kelly et al. | 375/229 |
| 7,181,402 | B2 * | 2/2007 | Jax et al. | 704/500 |
| 7,302,062 | B2 * | 11/2007 | Christoph | 381/57 |
| 7,359,671 | B2 * | 4/2008 | Richenstein et al. | 455/3.06 |
| 7,593,533 | B2 * | 9/2009 | Fincham | 381/17 |
| 2001/0031060 | A1 * | 10/2001 | Carver | 381/345 |
| 2002/0154783 | A1 * | 10/2002 | Fincham | 381/17 |
| 2003/0161479 | A1 * | 8/2003 | Yang et al. | 381/22 |
| 2003/0179891 | A1 * | 9/2003 | Rabinowitz et al. | 381/103 |
| 2004/0013272 | A1 * | 1/2004 | Reams | 381/1 |
| 2004/0091120 | A1 * | 5/2004 | Kantor et al. | 381/61 |
| 2005/0018860 | A1 | 1/2005 | Furge et al. | |
| 2005/0063201 | A1 * | 3/2005 | Yamazaki | 363/21.01 |
| 2005/0094822 | A1 * | 5/2005 | Swartz | 381/56 |
| 2005/0094829 | A1 * | 5/2005 | Cordell | 381/103 |
| 2005/0135631 | A1 * | 6/2005 | Yoshino | 381/59 |
| 2005/0195993 | A1 * | 9/2005 | Kwon et al. | 381/102 |
| 2006/0013295 | A1 * | 1/2006 | Kuijk et al. | 375/229 |
| 2006/0034472 | A1 * | 2/2006 | Bazarjani et al. | 381/111 |
| 2006/0088175 | A1 | 4/2006 | Eid et al. | |
| 2006/0147057 | A1 | 7/2006 | Aggarwal et al. | |
| 2006/0245485 | A1 * | 11/2006 | Martin et al. | 375/229 |
| 2007/0025559 | A1 | 2/2007 | Mihelich et al. | |

OTHER PUBLICATIONS

Analog and Digital Systems, Inc., Product Brochure, copyright 1998.

* cited by examiner

FREQUENCY NORMALIZATION OF AUDIO SIGNALS

FIELD OF THE INVENTION

The present invention generally relates to the field of audio technology, and more particularly to a method and system for normalizing the frequency response of an audio source.

BACKGROUND OF THE INVENTION

In 1929, Paul Galvin, the head of Galvin Manufacturing Corporation, invented the first car radio. As the first car radios were not available from car makers, consumers had to purchase the radios separately. Lacking modern solid state electronics, these early radios were quite bulky as they were formed using vacuum tubes.

Since the introduction of this first car radio over 75 years ago, car audio systems have undergone a significant evolution. The movement to add more than just a basic radio to a car largely originated on the west coast of the United States in the late 1970's. Several early manufacturers and audio enthusiasts, such as the founder of Rockford Fosgate, Jim Fosgate, led this movement and began building audio amplifiers to run on the standard voltage in automotive electrical systems.

Today, unlike 75 years ago, auto manufacturers routinely include audio systems as standard equipment with modern vehicles. A stock car audio system refers to exactly what the manufacturer specified when constructing the car. These original factory components are referred to as Original Equipment Manufacturer (OEM) components. A custom car audio installation involves changing and/or adding "after-market" components, including anything from the upgrade of the radio/cd player to a full-blown customization of a car based around delivering exceptional sound quality or volume from audio equipment.

High-end audio systems typically include component speakers that comprise of a matched tweeter, mid-range and woofer set. These component pairs are available in two speaker and three speaker combinations, and include a crossover which limits the frequency range that each component speaker must handle. In addition, a subwoofer(s) is provided for low frequency music information. Amplifiers boost the music signals to drive the speakers.

The most common and familiar piece of audio equipment is the radio/tape player/CD player, which is generically described as a head-unit. Since their creation, car audio head-units have generally comprised of self-contained units. The controls to operate these head-units were placed directly on the head-units. Further, these head-units typically included self-contained modular audio components such as the radio, cassette player, or CD player. As such, the head-unit has proved a highly popular component that a consumer could remove and upgrade with an after-market item that had greater functionality and quality. With the removal and replacement of the OEM head-unit, a consumer could then upgrade the car amplifier and speakers.

The human ear is capable of hearing frequencies from 20 Hz to 20 kHz. A device capable of handling frequencies from 20 Hz to 20 kHz is referred to as a full range device. An audio signal that possesses frequency information ranging from 20 Hz to 20 kHz is referred to as having full range frequency information. These different frequencies are combined to create sound. For example, a bird chirping may create frequencies around 10,000 Hz, while the human voice is around 3,000 Hz. The sound of a door slamming may lie closer to 200 Hz. These are only some examples of different sounds and their frequencies.

Music is comprised of many frequencies. Ideally, the perfect reproduction of sound would have a full range flat frequency response. A flat frequency response is one where all of the frequencies have the same amplitude or level. While a flat frequency response is desirable, it is possible to manipulate the frequency response of the sound signal to create a unique sound field for a specific vehicle. For example, many manufacturers will use the OEM head unit to attenuate low frequencies because the speakers cannot reproduce those signals accurately without sound distortion.

However, after-market head-units can offer a consumer a music frequency response without frequency or amplitude conditioning. No modifications or filtering are performed on the music signal information with an after-market head-unit, thereby allowing the reproduction of the signal as the artist intended. Consequently, replacement of the OEM head-unit is one of the most common ways to upgrade a car audio system.

The advancement of consumer electronics has enabled auto manufacturers to greatly enhance the features offered to consumers in automobiles. These features range from head-unit controls on the steering wheel and factory alarms, all the way to voice recognition, navigation, and integrated video systems. Many, if not all of these features are integrated into the OEM head-unit. The high level of integration of the OEM head-unit with the rest of the car electrical system in modern vehicles presents a problem for a consumer who wishes to install high fidelity after-market components. If the OEM head-unit is removed, these additional features are either lost or require expensive adapters to function. Sometimes, it is actually not possible to remove the OEM head-unit and still allow the car to function as designed. Further, replacing OEM amplifiers and speakers with high quality after-market items generally requires replacement of the OEM head-unit. As such, the introduction of highly integrated OEM head-units by auto manufacturers presents a significant problem.

One currently known method of addressing this problem is through the use of a device called a line-level converter. These devices convert a high-voltage level signal to a low voltage level signal. The line level converter is placed between an OEM amplifier and an after-market amplifier and after-market speakers. The line-level converter receives the high voltage signal from the OEM amplifier that would originally get transmitted to an OEM speaker, reduces it to a low voltage level line signal, and feeds it to an after-market amplifier. The after market amplifier then increases the signal and transmits it to after-market speakers. This conversion is an adequate solution to this problem if the audio content leaving the OEM head-unit has the same frequency response as that which an after-market head-unit would provide. However, typically the OEM head-units do not provide a flat frequency response, but rather typically provide a frequency response that is inferior to the flat frequency response an after-market amplifier and speakers are capable of supporting. This conditioned signal formed by the OEM head-unit that is highly integrated with the car electrical system is therefore an ongoing problem when it is not possible to remove the OEM head-unit. It is therefore highly desirable to develop an audio system that can produce a flat audio response from a factory OEM head-unit that conditions a signal.

SUMMARY OF THE INVENTION

According to a preferred embodiment of the invention, a system and method is provided to produce a flatter frequency response from an audio source that has a non-flat frequency response and, as such, has missing spectral content. The system and method achieves a flatter frequency response by characterizing the frequency response of the audio source based upon a reference input signal. This reference input signal is used to establish a reference frequency response, which is stored in a memory and used to select equalizer settings. The system restores missing spectral content by way of summing multiple input signals from the audio source. The system then normalizes the frequency response based on characterizations of the signal by utilizing equalizer settings from memory.

DETAILED DESCRIPTION OF PREFERRED EMBODIMENTS

Figure 1:
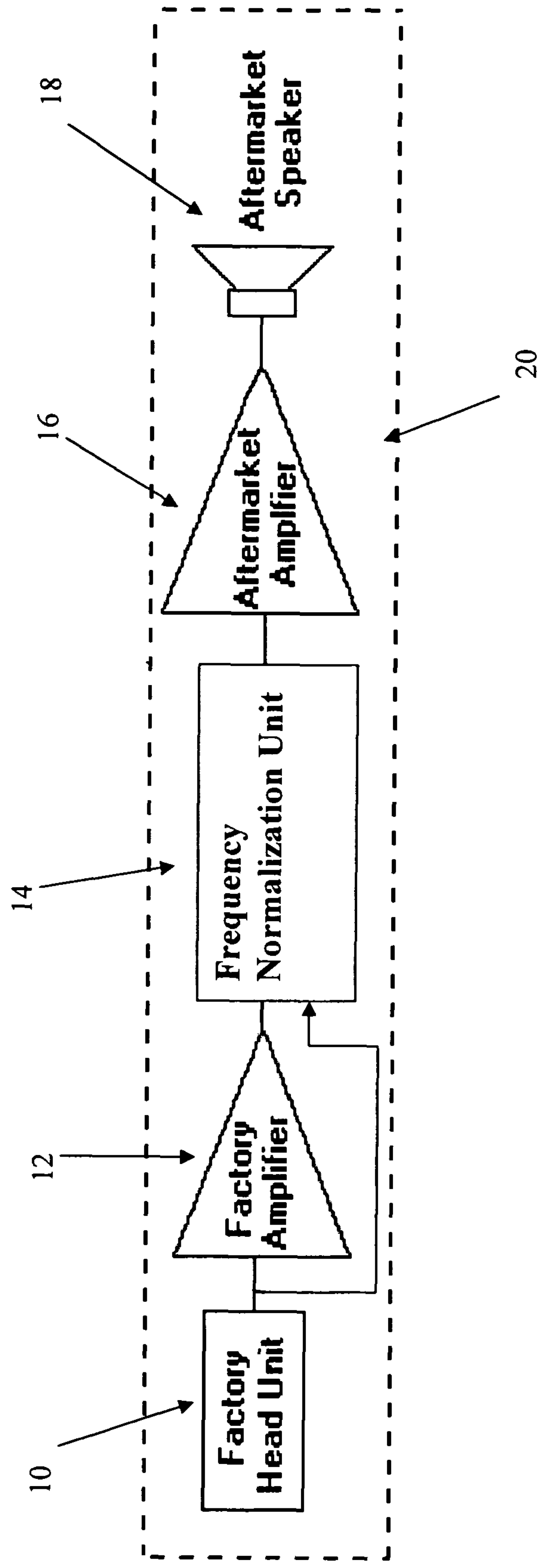
FIG. 1 illustrates a block diagram of an audio system.

Referring to the Figures by characters of reference, FIG. 1 illustrates a block diagram of an audio system. The block diagram of FIG. 1 includes an OEM head-unit 10, a factory amplifier 12, a frequency normalization unit 14, an after-market amplifier 16, and an after-market speaker 18. Together, OEM head-unit 10, an OEM amplifier 12, a frequency normalization unit 14, an after-market amplifier 16, and an after-market speaker 18 form audio system 20. Audio system 20 includes frequency normalization unit 14 to enable the addition for after-market amplifier 16 and after-market speaker 18 to OEM head-unit 10 and OEM amplifier 12.

OEM head-unit 10 typically conditions an audio signal in order to achieve a specific desired effect and compensate for other deficiencies of the low-cost OEM speakers. This effect can be used for many things including reducing the low spectral content, tuning the audio system based on the acoustic signature of the vehicle or for various other sonic responses. OEM head-unit 10 reduces the low spectral content of the music signal so that the low bass sounds do not damage the OEM speakers. As such, OEM head-unit 10 does not produce a signal with a full range flat frequency response. As such, frequency normalization unit 14 is provided to produce a flatter frequency response and allow for OEM head-unit 10 to remain a part of audio system 20.

OEM head-unit 10 produces a low line-level voltage signal. OEM amplifier 12 steps up the power of this low line-level voltage signal to a high voltage signal. OEM head-unit 10 and OEM amplifier 12 may be contained in the same unit. Frequency normalization unit 14 receives this high voltage signal, converts it back to a low line-level voltage signal, and normalizes the response of the audio signal to that of a full range flatter frequency response. Frequency normalization unit 14 may also accept low line-level voltage signals as well. Frequency normalization unit 14 reverses the signal conditioning that is performed by OEM head-unit 10.

After-market amplifier 16 receives the low line-level voltage signal from frequency normalization unit 14 and steps it back up to a high voltage signal that then drives after-market speaker 18. Through the use of frequency normalization unit 14, it is possible to continue to use OEM head-unit 10 and OEM amplifier 12 with audio system 20 and still achieve a full range flatter frequency response that is used by after-market amplifier 16 to drive after-market speakers 18.

Figure 2:
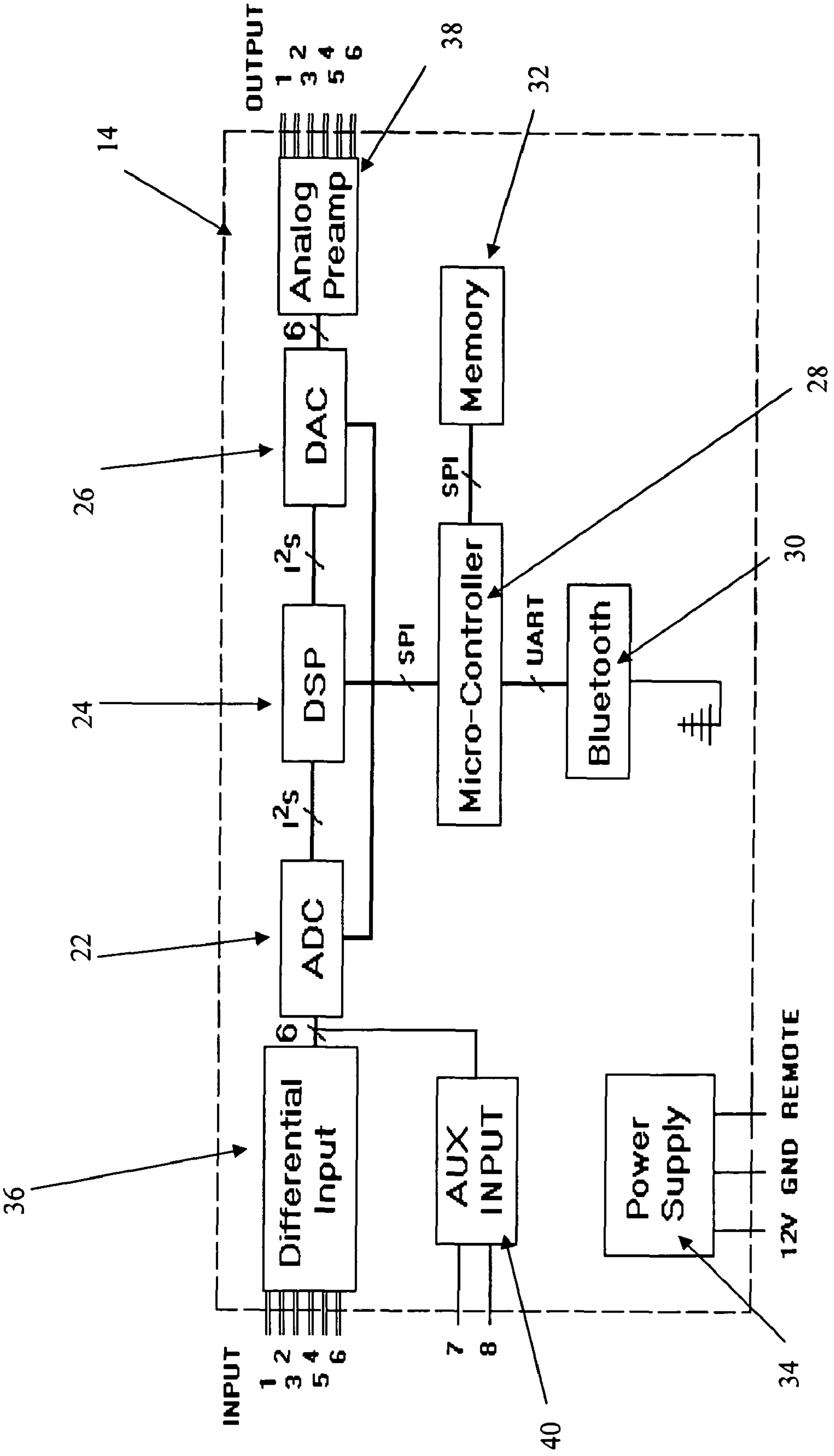
FIG. 2 illustrates a block circuit diagram of a frequency normalization unit.

FIG. 2 illustrates a block circuit diagram of frequency normalization unit 14. Frequency normalization unit 14 includes an Analog-to-Digital Converter 22 (ADC), a Digital Signal Processor 24 (DSP), a Digital-to-Analog Converter 26 (DAC), a microcontroller 28, and a communication Integrated Circuit 30 (IC). Frequency normalization unit 14 also includes memory 32, a power supply 34, differential input 36, analog preamplifier 38, and auxiliary input 40. Frequency normalization unit takes the analog audio signal from OEM amplifier 12 and re-digitizes it, processes the signal in digital form, and produces an analog signal that has a full range flatter frequency response.

Since the introduction of the compact disc in the early 1980s, digital technology has become the standard for the recording and storage of high-fidelity audio. Digital signals are robust. Digital signals can be transmitted and copied without distortion. Digital signals can be played back without degrading the carrier. OEM head-unit 10 primarily reads music information from a digital source such as a compact disk, a stored MP3 file, digital radio, or other digital source. However, OEM head-unit 10 may also acquire analog music information from an analog audio source such as an analog radio signal. Regardless of the source of the information, OEM head-unit 10 converts all digital signals into an analog signal for amplification by OEM amplifier 12 in order to drive speakers. In order to process the signal information from OEM head-unit 10 and normalize it to a flatter frequency response for playing on after-market speakers 18, the signal information is re-digitized by frequency normalization unit 10 and manipulated by a Digital Signal Processing (DSP) technique.

Digital Signal Processing is a technique that converts signals from real world sources (usually in analog form), such as OEM amplifier 12, into digital data that can then be analyzed. Analysis is performed in digital form because once a signal has been reduced to numbers, its components can be isolated, analyzed and rearranged more easily than in analog form.

The input signal to frequency normalization unit 14 is an analog signal. Differential input 36 is the input section of frequency normalization unit 14. Differential input 36 accepts six separate input channels, labeled 1-6. These six separate input channels are the individual audio channels of multi-channel audio system 20. Multi-channel audio refers to the use of multiple sound sources to create a richer music experience. In a six channel audio system, the six audio channels correspond to the following speaker units: front left speaker, front center speaker, front right speaker, left surround speaker, right surround speaker, and the subwoofer. The use of a six channel audio system is merely exemplary. Other audio configurations that use fewer than six, or more than six channels can be implemented with frequency normalization unit 14. Differential input 36 is an input circuit that actively responds to the differences between channels 1-6. This is desirable in this application as a ground reference is not required. OEM head-units rarely contain a power supply and because of this, the voltage rails required to reproduce the musical content range from ground potential (0 volts) up to the battery voltage (12.6/14.4 volts). This leads to a DC offset of typically 6 volts. Differential input 36 outputs the difference in voltage between the two of the input leads. The differential input section allows the audio content (AC) into the device while simultaneously blocking the DC offset. Another benefit to differential signals is that noise common to both leads is cancelled by this arrangement.

ADC 22 samples the analog signal that is output from differential input section 36 and converts it to a series of digital values to represent the signal at a sampling rate f(s). The primary input to ADC 22 is differential input section 36. However, ADC 22 may also accept input from auxiliary input 40. Auxiliary input 40 is used to receive an analog audio signal from a source different from OEM head-unit 10, such as an external MP3 player, an external satellite radio device, or other audio consumer electronic device.

ADC 22 digitizes the analog audio signal into a digital signal according to the Inter-IC Sound (I2S) standard. The I2S standard is a protocol for transmitting two channels of digital audio data over a single serial connection. I2S comprises a serial bus (path) design for digital audio devices and technologies such as compact disc (CD) players, digital sound processors, and digital TV (DTV) sound. The I2S design handles audio data separately from clock signals. By separating the data and clock signals, time-related errors that cause deviation in or displacement of some aspect of the pulses in a high-frequency digital signal do not occur, thereby eliminating the need for various deviation correction devices. An I2S bus design includes three serial bus lines: a line with two time-division multiplexing (TDM) data channels, a word select line, and a clock line.

Once the audio signal is converted to an I2S format, DSP 24 processes the audio signal. DSP 24 is a special-purpose CPU (Central Processing Unit) that provides ultra-fast instruction sequences, such as shift and add, and multiply and add, which are commonly used in math-intensive signal processing applications. DSP 24 is not the same as a typical microprocessor. Microprocessors are typically general purpose devices that run large blocks of software. They are not often called upon for real-time computation and they work at a slower pace, choosing a course of action, then waiting to finish the present job before responding to the next user command. DSP 24, on the other hand, is often used as a type of embedded controller or processor that is built into another piece of equipment, such as frequency normalization unit 14, and is dedicated to a single group of tasks, such as analysis of a music signal to facilitate its conversion to a signal possessing a flatter frequency response.

DSP 24 is classified by its dynamic range, the spread of numbers that must be processed in the course of an application. This number is a function of the processor's data width (the number of bits it manipulates) and the type of arithmetic it performs (fixed or floating point). For example, a 32-bit processor has a wider dynamic range than a 24-bit processor, which has a wider range than 16-bit processor. Floating-point chips have wider ranges than fixed-point devices.

Each type of processor is suited for a particular range of applications. Sixteen-bit fixed-point DSPs are used for voice-grade systems such as phones, since they work with a relatively narrow range of sound frequencies. Hi-fidelity stereo sound has a wider range, calling for a 16-bit ADC (Analog/Digital Converter), and a 24-bit fixed point DSP. Image processing, 3-D graphics and scientific simulations have a much wider dynamic range and require a 32-bit floating-point processor.

DSP 24 architectural features are designed to perform discrete mathematical operations as quickly as possible, preferably within a single instruction cycle. DSP 24 is preferably configured to provide single-cycle computation for multiplication with accumulation, arbitrary amounts of shifting, and standard arithmetic and logical operations. Extended sums-of-products, common in DSP algorithms, may be supported in multiply-accumulate units. Extended precision in the multiplier's accumulator can provide extra bits for protection against overflow in successive additions to ensure that no loss of data or range occurs. In extended sums-of-products calculations, two operations are needed on each cycle to support the calculation. DSP 24 is preferably able to sustain two-operand data throughput, whether the data is stored on-chip or off.

Eventually, when the DSP 24 has finished its processing of the audio signal, the digital data is turned back into an analog signal by DAC 26, with improved quality and a flatter frequency response. This analysis process is handled quickly in real-time. For instance, stereo equipment handles sound signals of up to 20 kilohertz (20,000 cycles per second), requiring DSP 24 to perform hundreds of millions of operations per second. The audio signal is transmitted between DSP 24 and DAC 26 according to the I2S protocol.

DAC 26 transforms a digital word representing an analog value such as a voltage into an output corresponding to that analog signal. The fineness of the signal is represented by resolution in bits. Important device specifications to consider when searching for digital-to-analog converters include number of output channels, resolution, maximum or reference voltage, bandwidth, accuracy, and output impedance. The analog output voltage at this stage contains discrete steps, each step representing one sample. These steps can be smoothed out by way of a low-pass filter.

Microcontroller 28 coordinates the operation of ADC 22, DSP 24, and DAC 26. Audio signal information gained through the analysis of the audio signal by DSP 24 is stored in memory 32 by microcontroller 28. This audio signal information stored in memory 32 is utilized by frequency normalization unit 14 to condition the audio signal to have a flatter frequency response. Microcontroller 28 preferably communicates with ADC 22, DSP 24, and DAC 26 and memory 32 through an SPI protocol. It is a full-duplex protocol that functions on a master-slave paradigm that is ideally suited to data stream application. SPI requires four signals: clock (SCLK), master output/slave input (MOSI), master input/slave output (MISO), slave select (SS).

Three signals are shared by all devices on the SPI bus: SCLK, MOSI and MISO. SCLK is generated by the master device and is used for synchronization. MOSI and MISO are the data lines. The SPI protocol utilizes bi-directional communication within its bus structure. This data bus is shared with all devices connected to the network. Each device only responds to the data bus when its slave select (SS) line is pulled low. The remainder of the time the data on the bus is simply ignored.

Each device has its own SS line. The master pulls low on a slave's SS line to select a device for communication. SPI is a very simple communication protocol. It does not have a specific high-level protocol which means that there is almost no overhead. Data can be shifted at very high rates in full duplex. This makes it very simple and efficient in a single master single slave scenario. Because each slave needs its own SS, the number of traces required is n+3, where n is the number of SPI devices.

Frequency normalization unit 14 may be provided with a wireless capability. Communication IC 30 may be coupled to microcontroller 28. Communication IC 30 is wireless enabled, thereby allowing a controller to program microcontroller 28 from a remote device such as a PDA, or other wireless device. A preferred device for communication IC 30 is a BLUETOOTH® enabled device. BLUETOOTH is an industrial specification for wireless Personal Area Networks (PANs). BLUETOOTH provides a way to connect and exchange information between devices like personal digital assistants (PDAs), mobile phones, laptops, PCs, and other consumer devices that are enabled with a BLUETOOTH communications chip via a secure, low-cost, globally available short range radio frequency. BLUETOOTH allows these devices talk to each other when they come in range, even if they are not in the same room, as long as they are within 10 meters (32 feet) of each other.

IC 30 couples to microcontroller 28 via a UART port. A UART or Universal Asynchronous Receiver-Transmitter is a device that controls microcontroller's 28 interface to IC 30. Specifically, it provides microcontroller 28 with an interface so that it can "talk" to and exchange data with IC 30. As part of this interface, the UART converts the bytes it receives from microcontroller 28 along parallel circuits into a single serial bit stream for outbound transmission. On inbound transmission, UART converts the serial bit stream into the bytes that microcontroller 28 handles. UART may also add a parity bit on outbound transmissions and checks the parity of incoming bytes and discards the parity bit. UART may also add start and stop delineators on outbound and strips them from inbound transmissions. BLUETOOTH devices and modules are increasingly being made available with an embedded stack and a standard UART port.

DAC 26 is coupled to analog preamplifier 38. Preamplifier 38 is an electronic amplifier designed to prepare an electrical signal for further amplification by after-market amplifier 16. Preamplifier 38 amplifies the low level signal from DAC 26 and applies an anti-alias filter to the audio signal. An anti-alias filter is a low-pass filter designed to remove all content above 20,000 Hz. After-market amplifier 16 is a power amplifier that boosts the power of the audio signal from this low line level signal to a high power signal to drive after-market speakers 18.

Figure 3:
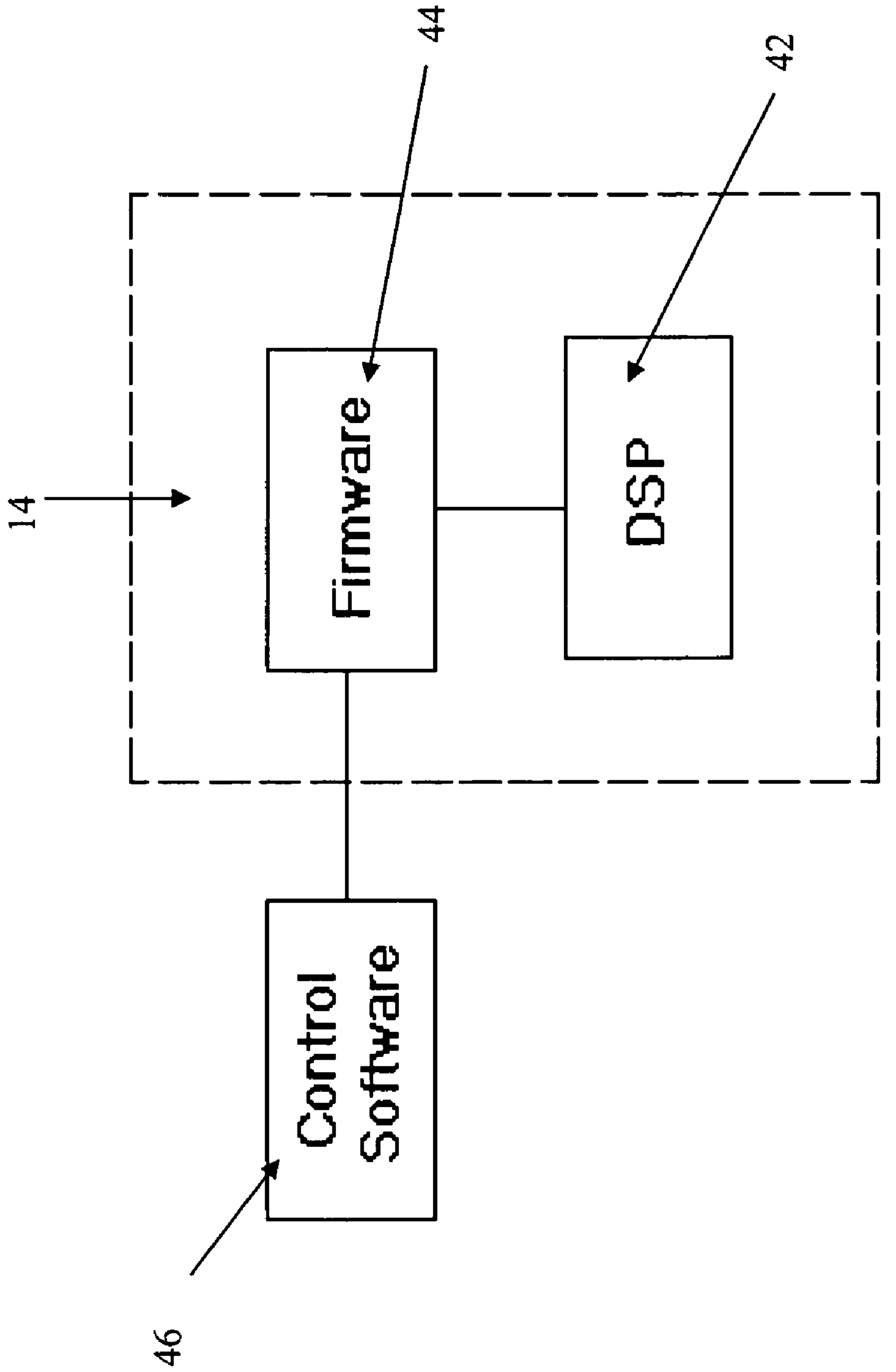
FIG. 3 illustrates a software block diagram of a frequency normalization unit.

FIG. 3 illustrates a software block diagram of frequency normalization unit 14. There are three basic sections to the software of frequency normalization unit 14: DSP code section 42, device firmware code section 44, and control software 46 located on a PDA or other device. DSP code section 42 manages the manner in which DSP 24 processes and analyzes the audio signal. Firmware 44 is responsible for controlling the hardware, such as ADC 22, DSP 24, DAC 26, IC 30, and microcontroller 28. This role includes communicating with the control software 46, initializing ADC 22 and DAC 26 as well as programming DSP 24. DSP 24 has a responsibility to process the digitized audio. Control software 46 has two functions. The primary role is a User Interface (UI). This UI allows the user to configure DSP 24 to produce a desired audio signal normalization. The other role that control software 46 provides is the artificial intelligence as to the correction factors used to normalize the incoming audio to a flatter frequency response.

The control software configures the hardware based on the desired mode of operation. The first mode of operation is to analyze the frequency response of the audio signal carried on each of the six input channels from OEM head-unit 10. In this mode, DSP 24 is configured to accept input from each of the six input channels and analyze the frequency response of each channel. DSP 24 may be configured to accept input from fewer than six channels, or more than six channels, depending upon the number of channels that form multi-channel audio system 20. This data is sent back to the control software where decisions can be made. The control software determines if the audio content is full band (20 to 20 kHz) for the five speaker channels and full band (10 Hz-200 Hz) for the subwoofer. If any of the six channels have a frequency response that does not encompass the full range of the channel band, the software will inform the user.

A channel will not have a frequency response that encompasses the full range of the channel band if OEM head-unit 10 conditions the audio signal. OEM head-unit 10 may condition the audio signal to limit the range of the audio frequency response to enable the original equipment manufacturer to use speakers that are incapable of handling a full range audio signal for various reasons. Also, a particular auto manufacturer may decide that the music within a particular vehicle has a better sound quality if they condition the audio signal and limit the frequency response of one or more of the channels in accordance with the perceived acoustics of the vehicle interior. The frequency response of a particular channel that is lost to frequency conditioning by the OEM head-unit may be recovered by summing the frequency responses of the various channels together.

Figure 4:
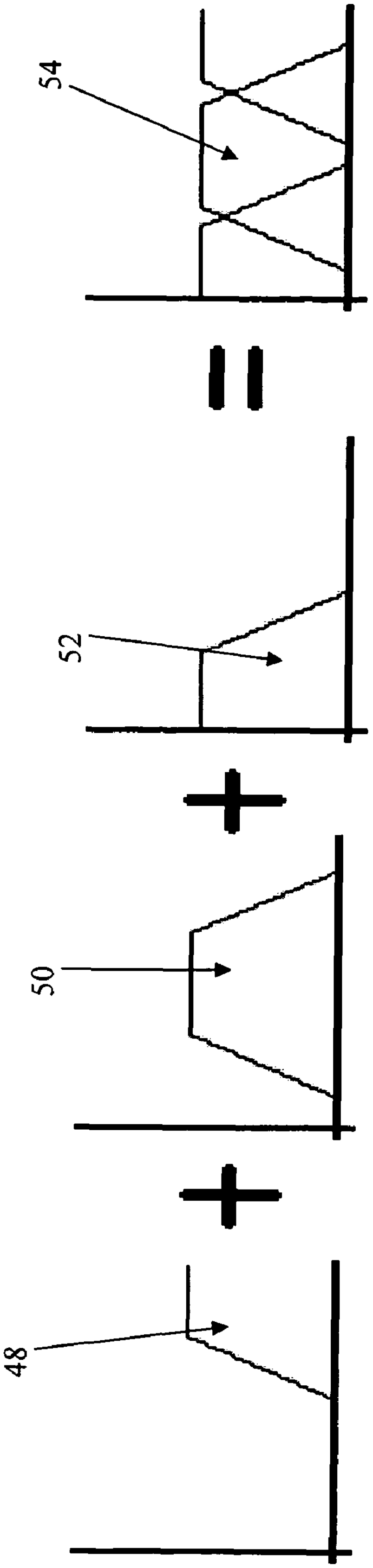
FIG. 4 illustrates a process for normalizing an ideal signal.

FIG. 4 illustrates a process for normalizing an ideal signal. In a multi-channel speaker system, OEM head-unit 10 may condition the frequency response of each channel depending upon the type of speaker that the original system may have contained prior to the upgrade with after-market amplifier 16 and after-market speakers 18. For instance, the OEM speaker system may have included tweeters that played high frequencies, midrange speakers that played middle range to high range frequencies, bass speakers that play low frequencies, and a subwoofer that plays very low frequencies. For the channels connected to the tweeters, OEM head-unit 10 may have passed the audio signal through a high pass filter to cut off all of the frequency content below the range of the tweeter. Similarly, OEM head-unit may have passed the audio signal through band pass and low pass filters for the midrange, and bass speakers/subwoofer respectively. As such, channels that carry an audio signal that is conditioned by one of these filters does not possess full range frequency information. One can recover the frequency information stripped by a low, high, or band pass filter by summing the frequency responses of all of the channels, as some channels will possess high frequency information, some will possess mid frequency information, and some will possess low frequency information. FIG. 4 illustrates the process of combining these various channels possessing conditioned frequency information to form a channel possessing full range frequency information. Frequency graph 48 illustrates an ideal frequency response of a channel that carries an audio signal processed through a high pass filter. Frequency graph 50 illustrates and ideal frequency response of a channel that carries an audio signal processed through a band pass filter. Frequency graph 52 illustrates an ideal frequency response of a channel that carries an audio signal processed through a low pass filter. Combining the frequency information possessed by graphs 48, 50, and 52 together enables the recreation of a frequency graph 54 that possesses full range frequency information. When summing frequency information, all of the left speaker channels are summed separately from all of the right speaker channels in order to preserve the stereo quality of the music. Graphs 48, 50, 52, and 54 each show frequency information with the x axis representing frequency and the y axis representing power.

Figure 5:
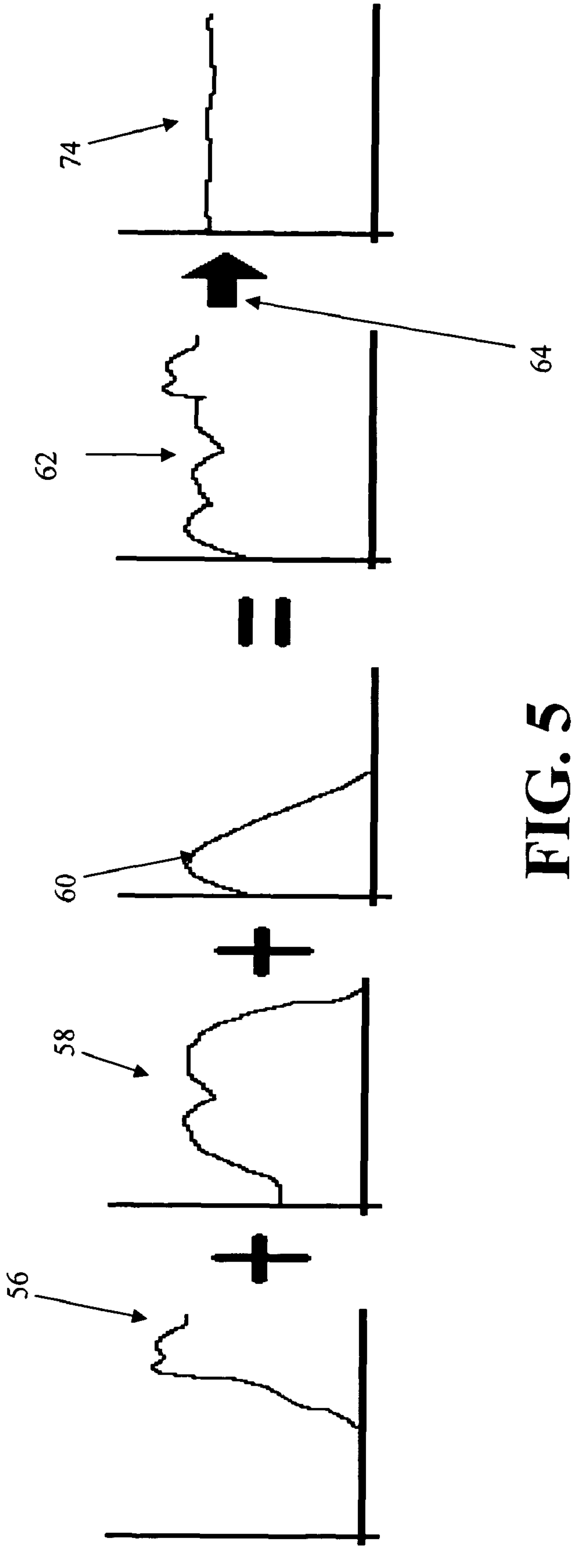
FIG. 5 illustrates a process for normalizing a typical signal.

FIG. 5 illustrates a process for normalizing a typical signal with non-ideal frequency characteristics. As discussed with respect to FIG. 4, it is possible to recover the full range of frequency information of an audio signal by summing the frequency response of channels that possess overlapping frequency information. Frequency graph 56 illustrates a common frequency response of a channel that carries an audio signal processed through a high pass filter. Frequency graph 58 illustrates a common frequency response of a channel that carries an audio signal processed through a band pass filter. Frequency graph 60 illustrates a common frequency response of a channel that carries an audio signal processed through a low pass filter. Summing frequency graphs 56, 58, and 60 produces frequency graph 62 that possesses frequency information that is full range. Graphs 56, 58, 60, and 62 each show frequency information with the x axis representing frequency and the y axis representing power. When summed, graph 54 in FIG. 4 possesses a flatter frequency response, as this is an ideal case. However, as shown by graph 62, the frequency response is not flat, the power varies with frequency. As such, in order to produce a flatter frequency response, the next step in the process is to normalize the frequency output as illustrated by arrow 64 and FIG. 6.

Figure 6:
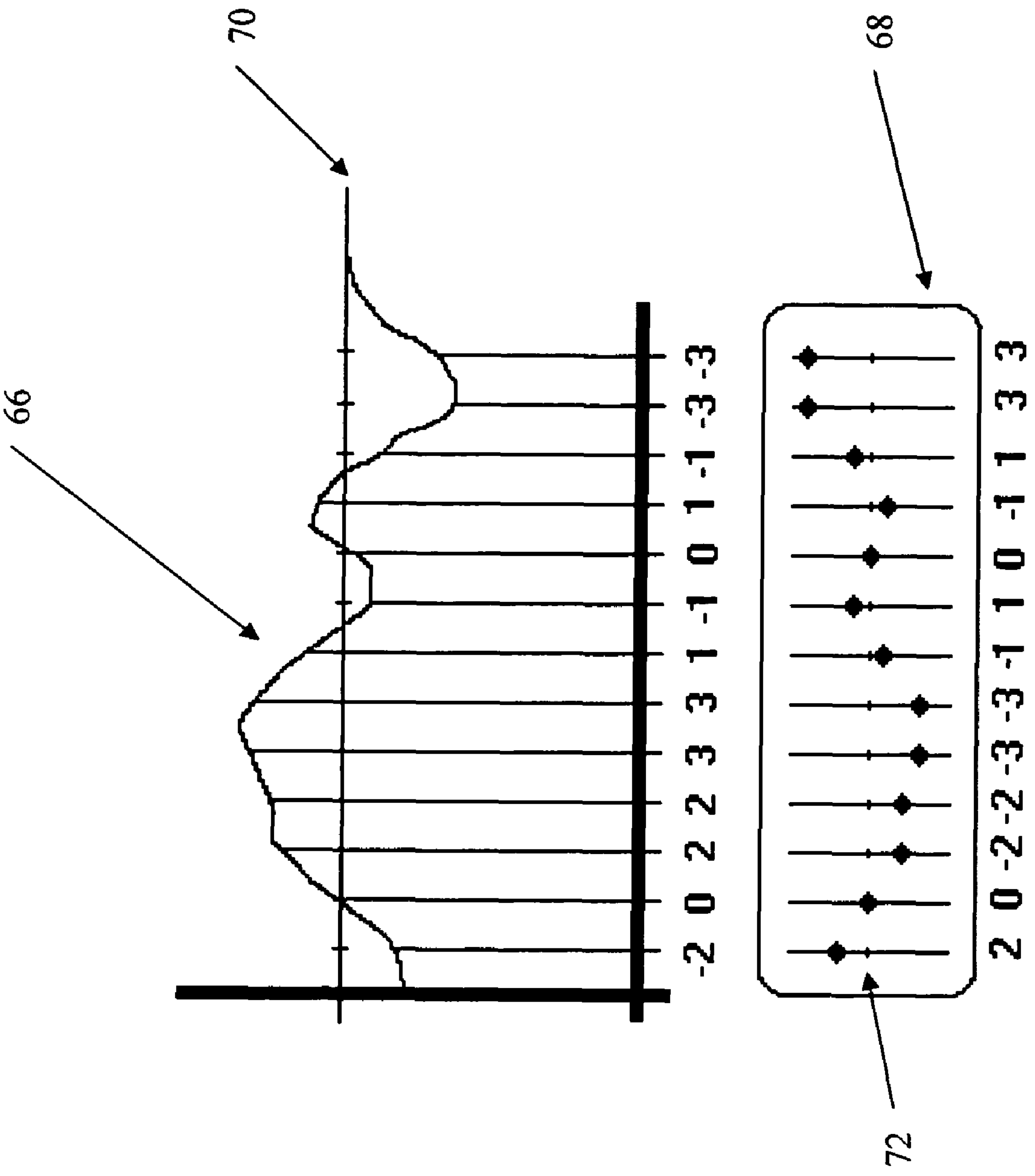
FIG. 6 illustrates a process for creating a flatter frequency response from a normalized frequency input.

The frequency normalization process is accomplished by using the data acquired during the initial stage where the frequency information was analyzed. Outputs 1 through 5 use a 31-band equalizer for the correction process. Each band corresponds to ⅓ octave. Channel 6 is a dedicated subwoofer channel so the frequency response is preferably 20 to 200 Hz. For this channel, a 10-band EQ is used for correction. FIG. 6 illustrates a process for creating a flatter frequency response from a normalized frequency input. Graph 66 is a detailed example showing the frequency response along with the equalization to normalize it. Below graph 66 is an equalizer 68. Before any correction to normalize the frequency response can take place, a desired power reference level 70 is chosen. This reference level 70 establishes the output level. The reference level 70, in one exemplary manner, is calculated by averaging the valid frequency response data. Valid data includes data points that are found in the pass-band only. For example, if channel 1 contains content from 20 Hz up to 1 kHz, the data above 1 kHz will not be used to calculate the reference voltage level. After a reference level is established, the position of each control on the correction equalizer 68 can be adjusted to compensate for the incoming response. FIG. 6 illustrates an example of a response 66 and corresponding equalizer level adjustments 72 to normalize said response to a flatter response. The result of this normalization is a flatter frequency response shown by graph 74 in FIG. 5.

Although a preferred embodiment of the present invention has been described in detail, it will be apparent to those of skill in the art that the invention may be embodied in a variety of specific forms and that various changes, substitutions, and alterations can be made without departing from the spirit and scope of the invention. The described embodiments are only illustrative and not restrictive and the scope of the invention is, therefore, indicated by the following claims.

What is claimed is:

1. A method for manipulating a frequency response of an audio source, comprising:

characterizing said frequency response of said audio source from at least two input signals, wherein said input signals are carried on multiple source channels;

storing said frequency response in a memory;

restoring missing frequency information to said at least two input signals by summing said multiple source channels;

producing an output signal having full range frequency information and a non-flat frequency response for each said at least two input signals;

selecting a power reference level; and correcting the output signal having full range frequency information based upon the power reference level to provide the output signal with a flat frequency response for each of said at least two input signals.

2. The method of claim 1, further comprising normalizing said frequency response to have a flatter frequency response.

3. The method of claim 1, further comprising configuring an equalizer setting from said memory to vary said output signal.

4. A method for processing an audio signal from a head unit comprising:

applying at least two analog input signals from a head unit carried on multiple inputs to a differential input;

converting each of said at least two analog input signals to a digital signal;

characterizing a frequency response of said digital signal;

determining if said digital signal possesses full frequency range information;

employing a microcontroller to direct a signal processor to sum said multiple inputs to recover lost frequency information when said digital signal does not possess full frequency range information;

producing an analog output signal possessing full range frequency information and a non-flat frequency response for each of said at least two input signals;

selecting a power reference level; and correcting the output signal having full range frequency information based upon the power reference level to provide the output signal with a flat frequency response for each of said at least two input signals.

5. The method of claim 4, further comprising storing said frequency response in a memory.

6. The method of claim 5, further comprising configuring an equalizer setting from said memory to vary said output signal.

7. The method of claim 4, further comprising processing said analog output signal to possess a flatter frequency response.

8. The method of claim 4, further comprising providing an instruction to sum said multiple inputs from a control device.

9. The method of claim 6, further comprising establishing a reference frequency response level for providing said analog output signal with a flatter frequency response.

10. The method of claim 4, further comprising processing said analog output signal with an analog preamplifier.

11. The method of claim 4, further comprising, accepting additional audio inputs from an auxiliary input.

12. A frequency normalization unit coupled between a head unit and an amplifier, comprising:

a input section that receives at least two analog signals from said head unit that is carried on multiple input channels;

an analog to digital converter that converts each of said at least two analog signals to a digital signal;

a digital signal processor coupled to said analog to digital converter that characterizes a frequency response of said digital signal;

a microcontroller coupled to said digital signal processor, said microcontroller directs said digital signal processor to sum said multiple input channels to recover lost frequency information, thereby producing an audio signal with a full range frequency response and a non-flat frequency response, and said microcontroller provides instructions to correct the audio signal based upon a power reference level to exhibit a flat frequency response; and a digital to analog converter coupled to said digital signal processor that converts said audio signal to an audio analog signal.

13. The frequency normalization unit of claim 12, said microcontroller provides instructions to said digital signal processor to processes said digital signal to have a flatter frequency response.

14. The frequency normalization unit of claim 12, further comprising a memory that stores said frequency response.

15. The frequency normalization unit of claim 12, further comprising a wireless communication unit coupled to said microcontroller.

16. The frequency normalization unit of claim 12, further comprising a preamplifier coupled to said digital to analog converter.

17. The frequency normalization unit of claim 12, further comprising an auxiliary input coupled to said analog to digital converter.

18. The method of claim 1, wherein selecting the power reference level involves averaging valid frequency response data.

19. The method of claim 18, further comprising providing a correction equalizer with a plurality of controls and adjusting the controls to compensate for an incoming response.

20. The method claim 1, wherein the power reference level is selected for all data points found in a pass-band.

* * * * *